(12) United States Patent
Omori

(10) Patent No.: US 9,677,609 B2
(45) Date of Patent: Jun. 13, 2017

(54) THRUST BEARING

(71) Applicant: IHI Corporation, Tokyo (JP)

(72) Inventor: Naomichi Omori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 24 days.

(21) Appl. No.: 14/809,933

(22) Filed: Jul. 27, 2015

(65) Prior Publication Data

US 2015/0330443 A1 Nov. 19, 2015

Related U.S. Application Data

(63) Continuation of application No. PCT/JP2014/051561, filed on Jan. 24, 2014.

(30) Foreign Application Priority Data

Jan. 28, 2013 (JP) ................................. 2013-013170

(51) Int. Cl.
| | |
|---|---|
| *F16C 32/06* | (2006.01) |
| *F16C 27/08* | (2006.01) |
| *F16C 27/02* | (2006.01) |
| *F16C 17/04* | (2006.01) |
| *F01D 25/16* | (2006.01) |

(52) U.S. Cl.
CPC ............ *F16C 27/08* (2013.01); *F01D 25/168* (2013.01); *F16C 17/042* (2013.01); *F16C 27/02* (2013.01);
(Continued)

(58) Field of Classification Search
CPC ......... F16C 17/042; F16C 27/02; F16C 27/08
See application file for complete search history.

(56) References Cited

U.S. PATENT DOCUMENTS

| | | | |
|---|---|---|---|
| 4,082,375 A | * | 4/1978 | Fortmann ............. F16C 17/042 384/105 |
| 4,315,660 A | | 2/1982 | Glienicke |

(Continued)

FOREIGN PATENT DOCUMENTS

| | | |
|---|---|---|
| JP | S55-166523 A | 12/1980 |
| JP | S61-038324 U | 3/1986 |

(Continued)

OTHER PUBLICATIONS

International Search Report received for PCT Patent Application No. PCT/JP2014/051561 mailed on Apr. 22, 2014, with English Translation, 4 pages.

(Continued)

*Primary Examiner* — James Pilkington
(74) *Attorney, Agent, or Firm* — Amster, Rothstein & Ebenstein LLP

(57) ABSTRACT

A thrust bearing disposed facing a thrust collar provided on a rotary shaft includes: a top foil disposed facing the thrust collar; a back foil supporting the top foil; and an annular shaped base plate supporting the back foil. The back foil includes back foil pieces, and the top foil includes top foil pieces. An area on the leading side of a top foil piece in the rotation direction of the rotary shaft is provided with a fixed part fixed to the base plate. A fixed edge positioned on the trailing side of the fixed part in the rotation direction linearly extends such that the separation between a straight line extending in the radial direction of the base plate and the fixed edge positioned on the trailing side of the straight line in the rotation direction gradually increases outward from inside in the radial direction.

11 Claims, 7 Drawing Sheets

(52) U.S. Cl.
CPC ...... *F05D 2220/40* (2013.01); *F05D 2240/52* (2013.01); *F16C 2360/00* (2013.01)

(56) References Cited

U.S. PATENT DOCUMENTS

| | | | |
|---|---|---|---|
| 4,597,677 | A | 7/1986 | Hagiwara |
| 5,547,286 | A | 8/1996 | Struziak |
| 5,871,284 | A * | 2/1999 | Nadjafi ................. F16C 17/042 384/105 |
| 8,147,143 | B2 | 4/2012 | Struziak et al. |
| 9,062,712 | B1 * | 6/2015 | Bruckner ............. F16C 17/024 |
| 9,157,472 | B2 * | 10/2015 | Kim ....................... F16C 17/042 |
| 2006/0062500 | A1 | 3/2006 | Struziak et al. |

FOREIGN PATENT DOCUMENTS

| | | |
|---|---|---|
| JP | S61-092316 A | 5/1986 |
| JP | S63-013915 A | 1/1988 |
| JP | S63-024422 U | 2/1988 |
| JP | S64-000719 U | 1/1989 |
| JP | H10-331847 A | 12/1998 |
| JP | H11-503811 A | 3/1999 |
| JP | 2002-195257 A | 7/2002 |
| JP | 2004-270904 A | 9/2004 |
| JP | 2006-057652 A | 3/2006 |
| JP | 2006-183786 A | 7/2006 |
| JP | 2008-513701 A | 5/2008 |
| JP | 2009-299748 A | 12/2009 |
| WO | 2014/061698 A1 | 4/2014 |

OTHER PUBLICATIONS

European Patent Office, "Extended European Search Report," dated Aug. 22, 2016, issued in European Patent Application No. 14 743 151.4, which is a European counterpart of U.S. Appl. No. 14/809,933 (6 pages).

\* cited by examiner

THRUST BEARING

This application is a Continuation Application based on International Application No. PCT/JP2014/051561, filed Jan. 24, 2014, which claims priority on Japanese Patent Application No. 2013-013170, filed Jan. 28, 2013, the contents of both of which are incorporated herein by reference.

TECHNICAL FIELD

The present disclosure relates to a thrust bearing.

BACKGROUND

In the related art, as a bearing used for a high-speed rotating body, a thrust bearing is known which is disposed so as to face a thrust collar provided on a rotary shaft and supports the thrust collar. As such a thrust bearing, a foil-type thrust bearing, namely a thrust foil bearing is well known. The bearing surface of the thrust foil bearing is formed of a flexible foil (metal thin sheet) in order to accept movement of the rotary shaft (movement in the axial direction of or inclination of the thrust collar) which occurs due to vibration or to impact, and the thrust foil bearing includes a foil structure which is provided under the bearing surface and flexibly supports the bearing surface.

As an example of the thrust foil bearing, a structure is known in which a circular ring-shaped (annular shaped) bearing surface is formed of foil pieces (top foil pieces) obtained by dividing a annular sheet in the circumferential direction thereof, and a wave sheet-shaped foil piece (bump foil piece) supports each top foil piece (for example, refer to Patent Document 1). Each top foil piece (the thickness thereof is about 100 μm) is arranged having an inclination angle with respect to the thrust collar, and thus a bearing clearance between the thrust collar and the top foil piece is formed in a wedge shape in side view. That is, the bearing clearance is formed so as to gradually decrease from the leading side toward the trailing side in the rotation direction of the thrust collar (the rotary shaft). Thus, when the thrust collar rotates from the large side (the leading side) toward the small side (the trailing side) of the bearing clearance, a lubricating fluid flows into a narrow part of the wedge-shaped bearing clearance, and the load capability of the bearing is obtained.

Only the edge of the top foil piece close to the leading side in the rotation direction of the thrust collar (the rotary shaft) is fixed to a base plate, and the edge is configured as a fixed edge. When a bearing load increases, in a state where the fixed edge (the edge on the leading side) is a fulcrum, the top foil piece moves so as to be horizontal (parallel to the supported surface of the thrust collar), the inclination angle thereof decreases, and at the time the inclination angle becomes about 0.1°, the thrust bearing generates the maximum load capability. In addition, the bump foil piece is arranged so that the ridge line of a peak thereof is parallel to the edge on the trailing side of the top foil piece, and only the edge of the bump foil piece close to the trailing side in the rotation direction of the thrust collar (the rotary shaft) is fixed to the base plate. That is, the edge on the leading side of the bump foil piece is a free end.

Since the bump foil piece is arranged and fixed in this way, the pressure of a fluid lubrication film formed at the top foil piece becomes high at the small side (the trailing side) of the bearing clearance. Thus, if this part is supported by a high rigidity, the load capability of the bearing can be increased.

DOCUMENT OF RELATED ART

Patent Document

[Patent Document 1] Japanese Unexamined Patent Application, First Publication No. H10-331847

SUMMARY

Technical Problem

In the above-described thrust foil bearing structure, the bearing clearance thereof is least at the position of the edge on the trailing side of the top foil piece, and when receiving a high load, the clearance at the position may become submicron. That is, contact between the top foil piece and the thrust collar may easily occur at the position of the edge on the trailing side of the top foil piece. If the contact occurs, the top foil or the like may be damaged, the useful life of the bearing may deteriorate, and in the worst case, seizure thereof may occur.

The present disclosure has been made in view of the above circumstances, and an object thereof is to provide a thrust bearing in which the edge on and the vicinity of the edge on the trailing side of a top foil piece are prevented from contacting a thrust collar, and thereby deterioration of the useful life of the bearing, seizure thereof and the like are prevented.

Solution to Problem

The inventor has diligently conducted researches in order to obtain the above object, and as a result, has obtained the following knowledge.

In order to prevent contact with a thrust collar, it is desirable to always set the edge being a free end on the trailing side of a top foil piece to be parallel to the thrust collar. However, in the top foil piece, the distance between the edge, which is a fixed edge fixed to a base plate, on the leading side thereof and the edge being the free end on the trailing side thereof gradually increases outward from inside in the radial direction of the base plate. Therefore, the outer circumferential edge of the top foil piece is longer than the inner circumferential edge thereof. In this case, if the top foil piece moves (rotates) away from the base plate or so as to approach the base plate due to variation or the like of a bearing load in a state where the edge being the fixed edge on the leading side thereof is set to a fulcrum (rotation center), the outer circumferential edge longer than the inner circumferential edge more greatly moves than the inner circumferential edge. Thus, when the top foil piece moves, a difference in height may occur between a part of the edge being the free end on the trailing side thereof close to the outer circumferential edge and another part of the edge close to the inner circumferential edge. That is, since the length (the distance between the edges on the leading and trailing sides thereof) of the outer circumferential edge of the top foil piece is greater than the length (the distance between the edges on the leading and trailing sides thereof) of the inner circumferential edge thereof, if the top foil piece moves in the above way, the amount of movement of a part of the edge on the trailing side thereof close to the outer circumferential edge becomes greater than that of another part of the edge close to the inner circumferential edge.

Therefore, when the top foil piece moves around the fixed edge being a fulcrum, a part of the edge on the trailing side thereof close to the outer circumferential edge or another part of the edge close to the inner circumferential edge may easily contact the thrust collar. In addition, if the edge being the free end on the trailing side of the top foil piece is arranged being non-parallel to the thrust collar, the bearing clearance (particularly, on the small side of the bearing clearance) is changed in the radial direction of the base plate, and thus proper load capability of the bearing may not be secured.

For example, even if the top foil is fixed to the base plate so that the edge on the trailing side of the top foil piece is parallel to the thrust collar while the bending work on the leading edge-side thereof is adjusted, when the inclination angle of the top foil piece decreases due to increase of a load or to the like, the parallel relationship between the edge on the trailing side of the top foil piece and the thrust collar may be disturbed.

The inventor has diligently further conducted researches based on the above knowledge, and as a result, has completed the present disclosure.

That is, a first aspect of the present disclosure is a thrust bearing disposed so as to face a thrust collar provided on a rotary shaft, the thrust bearing including: a top foil disposed so as to face the thrust collar; a back foil disposed so as to face a surface of the top foil opposite to another surface of the top foil facing the thrust collar, and supporting the top foil; and an annular shaped base plate disposed on a side of the back foil opposite to the top foil, and supporting the back foil. The back foil includes back foil pieces arranged in the circumferential direction of the base plate, and the top foil includes top foil pieces disposed on the back foil pieces. An area on a leading side of a top foil piece in the rotation direction of the rotary shaft is provided with a fixed part fixed to the base plate. In addition, a fixed edge positioned on a trailing side of the fixed part in the rotation direction of the rotary shaft linearly extends such that the separation between a straight line extending in the radial direction of the base plate and the fixed edge positioned on a trailing side of the straight line in the rotation direction of the rotary shaft gradually increases outward from inside in the radial direction of the base plate, and the fixed edge is non-parallel to the straight line.

A second aspect of the present disclosure is that in the thrust bearing of the first aspect, the fixed edge is formed so as to extend to an outer circumferential edge of the top foil piece from a position between two ends of a first edge positioned on the leading side of the top foil piece in the rotation direction of the rotary shaft.

A third aspect of the present disclosure is that in the thrust bearing of the first aspect, a first edge on the leading side of the top foil piece in the rotation direction of the rotary shaft includes an inner edge extending from an inner circumferential edge toward an outer circumferential edge of the top foil piece, and an outer edge extending to the outer circumferential edge from an end of the inner edge close to the outer circumferential edge. In addition, the outer edge is provided with the fixed edge.

A fourth aspect of the present disclosure is that in the thrust bearing of the second or third aspect, the fixed edge is formed to be parallel to a second edge on a trailing side of the top foil piece in the rotation direction of the rotary shaft.

A fifth aspect of the present disclosure is that in the thrust bearing of any one of the first to fourth aspects, the top foil piece includes a thin part formed in the vicinity on a trailing side of the fixed edge in the rotation direction of the rotary shaft, and the thin part is formed to be thinner than another part of the top foil piece.

A sixth aspect of the present disclosure is that in the thrust bearing of any one of the first to fifth aspects, a back foil piece is formed in a wave sheet shape in which peak parts and valley parts are alternately formed, and is disposed such that the direction, in which the peak parts are next to each other, crosses the extending direction in which the fixed edge extends. In addition, the height of the peak parts gradually increases toward a trailing side of the back foil piece in the rotation direction of the rotary shaft from an end of the back foil piece positioned to be close to the fixed edge.

A seventh aspect of the present disclosure is that in the thrust bearing of any one of the first to fifth aspects, the base plate is provided with support areas supporting the back foil pieces, and each support area is provided with an inclined surface whose height gradually increases from a position, in which the fixed edge is provided, toward a trailing side of the support area in the rotation direction of the rotary shaft.

A eighth aspect of the present disclosure is that in the thrust bearing of the seventh aspect, a back foil piece is formed in a wave sheet shape in which peak parts and valley parts are alternately formed, and is disposed such that the direction, in which the peak parts are next to each other, is the same as the inclination direction of the inclined surface.

A ninth aspect of the present disclosure is that in the thrust bearing of the sixth or eighth aspect, an edge on a trailing side of the back foil piece in the rotation direction of the rotary shaft is fixed to the base plate.

Effects

According to a thrust bearing of the present disclosure, the edge being a free end on the trailing side of the top foil piece can be maintained to be approximately parallel to the thrust collar. Thus, the edge on and the vicinity of the edge on the trailing side thereof can be prevented from contacting the thrust collar, and thereby deterioration of the useful life of the bearing, seizure thereof and the like can be prevented.

BRIEF DESCRIPTION OF DRAWINGS

FIG. 4A is a plan view of a top foil piece showing a modification of the shape of the top foil piece, the shapes of a fixed edge and of a fixed part, and the like.

FIG. 4B is a plan view of a top foil piece showing a modification of the shape of the top foil piece, the shapes of a fixed edge and of a fixed part, and the like.

FIG. 4C is a plan view of a top foil piece showing a modification of the shape of the top foil piece, the shapes of a fixed edge and of a fixed part, and the like.

FIG. 4D is a plan view of a top foil piece showing a modification of the shape of the top foil piece, the shapes of a fixed edge and of a fixed part, and the like.

DESCRIPTION OF EMBODIMENTS

Hereinafter, thrust bearings of the present disclosure are described in detail with reference to the drawings. In the following drawings, the scale of each member is appropriately changed in order to show each member in a recognizable size.

Figure 1:
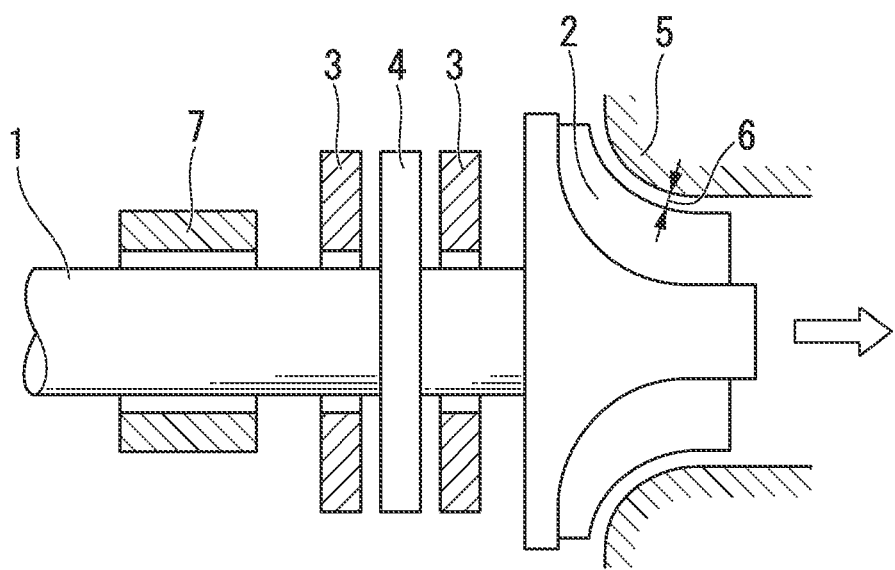
FIG. 1 is a schematic view showing an example of a turbo machine in which a thrust bearing of the present disclosure is provided.

FIG. 1 is a side view schematically showing an example of a turbo machine in which a thrust bearing of the present disclosure is provided. In FIG. 1, a reference numeral 1 represents a rotary shaft, a reference numeral 2 represents an impeller provided on an end part of the rotary shaft, and a reference numeral 3 represents the thrust bearing of the present disclosure.

A thrust collar 4 is fixed to the vicinity of the end of the rotary shaft 1 in which the impeller 2 is formed. A pair of thrust bearings 3 are disposed such that the thrust collar 4 is interposed therebetween.

The impeller 2 is disposed inside a housing 5 which is a stationary member, and a tip clearance 6 is formed between the impeller 2 and the housing 5.

A radial bearing 7 is provided on the rotary shaft 1 at a position closer to the center of the rotary shaft 1 than the thrust collar 4.

Figure 2:
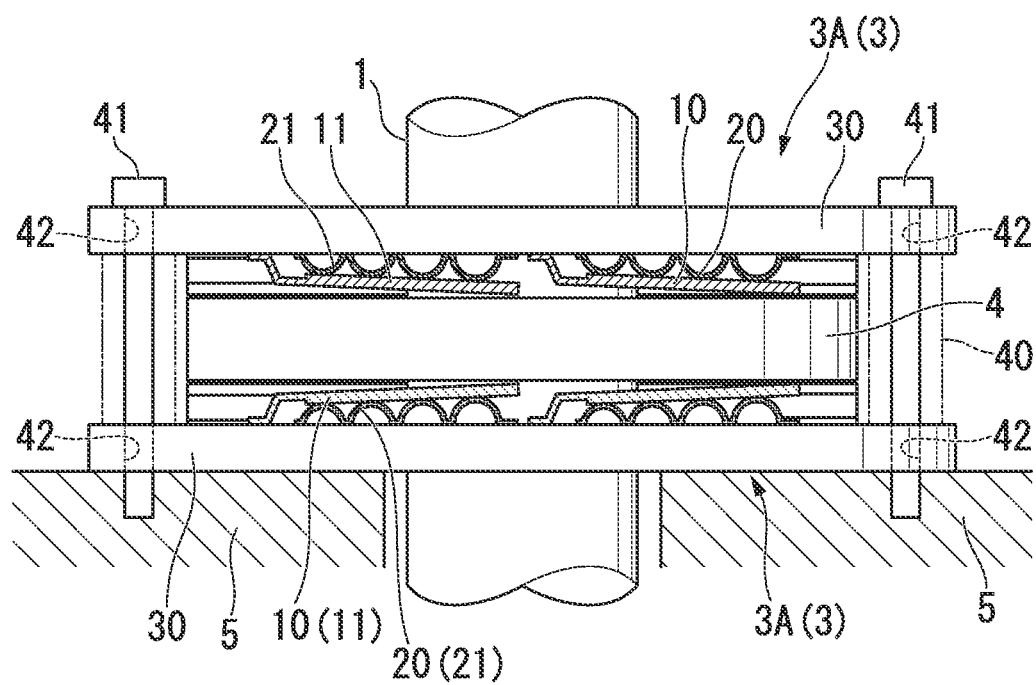
FIG. 2 is a view showing a first embodiment of a thrust bearing of the present disclosure, and is a side view of the thrust bearing in a state where a thrust collar is interposed therein.
Figure 3A:
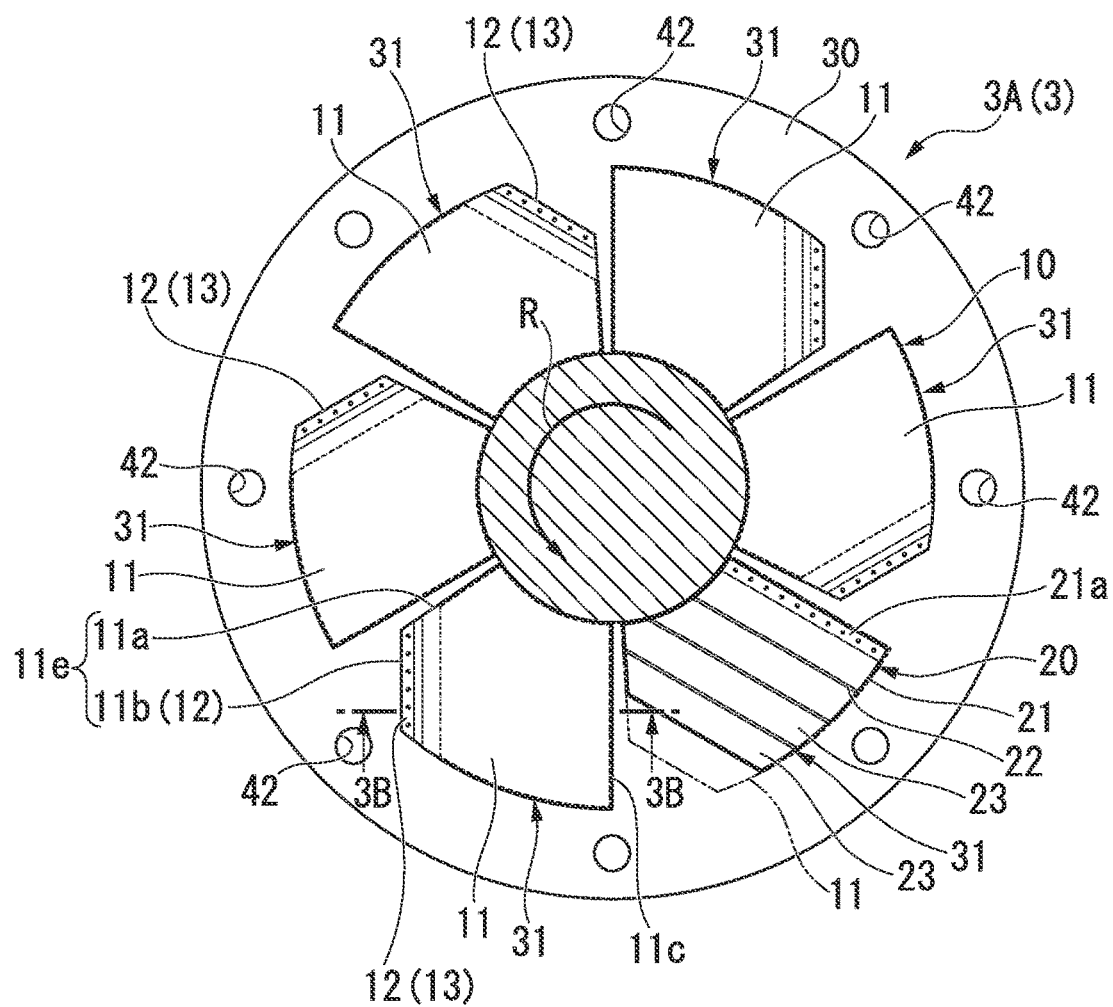
FIG. 3A is a view showing the first embodiment of the thrust bearing of the present disclosure, and is a partially cross-sectional plan view of the thrust bearing.
Figure 3B:
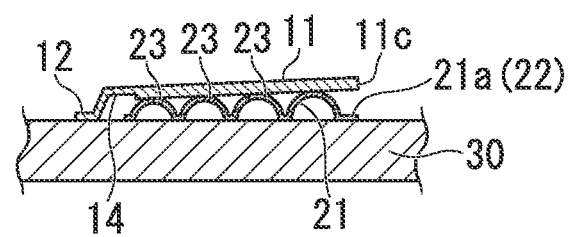
FIG. 3B is a cross-sectional view taken along 3B-3B line in FIG. 3A.
Figure 3C:
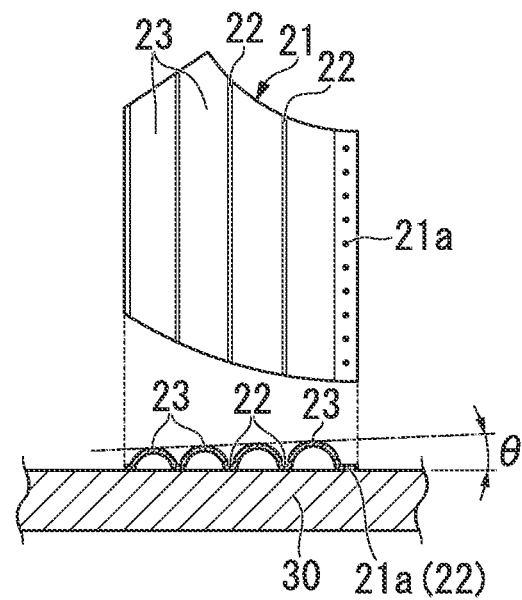
FIG. 3C is a view showing the first embodiment of the thrust bearing of the present disclosure, and is an explanatory view in which the plan view and the side view of a bump foil piece correspond to each other in order to show the shape of the bump foil piece.

FIGS. 2 and 3A to 3C are views showing a first embodiment of a thrust bearing 3 provided in the turbo machine having the above configuration. FIG. 2 is a side view of the thrust bearing 3 in a state where the thrust collar 4 is interposed therein. FIG. 3A is a partially cross-sectional plan view of the thrust bearing 3. FIG. 3B is a cross-sectional view taken along 3B-3B line in FIG. 3A. FIG. 3C is an explanatory view in which the plan view and the side view of a bump foil piece correspond to each other in order to show the shape of the bump foil piece.

As shown in FIG. 2, in the first embodiment, thrust bearings 3A(3) are disposed on two sides of the thrust collar 4 such that the thrust collar 4 is interposed therebetween. The pair of thrust bearings 3A(3) have the same structure, and are annular shaped (cylindrical shaped) devices disposed so as to face the circular plate-shaped thrust collar 4 fixed to the rotary shaft 1. The thrust bearings 3A(3) are provided encircling the rotary shaft 1. Two surfaces (two surfaces opposite to each other in the axial direction of the rotary shaft 1) of the thrust collar 4 are configured as supported surfaces, and the pair of thrust bearings 3A(3) are disposed so as to face and support the two supported surfaces of the thrust collar 4.

The thrust bearing 3A includes a top foil 10 disposed so as to face the thrust collar 4, a back foil 20 disposed so as to face a surface of the top foil 10 opposite to another surface of the top foil 10 facing the thrust collar 4, and an annular plate-shaped base plate 30 disposed on a side of the back foil 20 opposite to the top foil 10. In addition, the shape of the base plate 30 is not limited to an annular plate shape, and may be a cylindrical shape extending in the axial direction of the rotary shaft 1.

In this embodiment, a cylindrical bearing spacer 40 shown by dashed double-dotted lines is interposed between the base plates 30 of the pair of thrust bearings 3A, and the base plates 30 are connected to each other through the bearing spacer 40 using fastening bolts 41. In addition, the outer surface of one base plate 30 is fixed to the housing 5 using the fastening bolts 41. Thus, the pair of thrust bearings 3A are fixed to the housing 5 using the fastening bolts 41 in a state where the thrust collar 4 is interposed therebetween.

As shown in FIG. 3A, the base plate 30 is an annular plate-shaped metal member, and an outer circumferential part of the base plate 30 is provided with a plurality of through-holes 42 (the number thereof is eight in this embodiment) allowing the fastening bolts 41 to be inserted thereinto. The surface of the base plate 30 facing the thrust collar 4 is provided with a support area used to support the back foil 20 and the top foil 10. In this embodiment, as described later, the back foil 20 includes a plurality (six) of back foil pieces 21, and the top foil 10 includes a plurality (six) of top foil pieces 11. Thus, the base plate 30 is provided with six support areas 31 formed by dividing the surface of the base plate 30 into six areas (into equivalent six areas) arranged in the circumferential direction thereof. It is to be noted that the six support areas 31 in this embodiment are areas on the design, and the surface of the base plate 30 including the support areas 31 is formed in a uniform and flat surface.

As shown in FIG. 2, a back foil piece 21 and a top foil piece 11 are disposed in this order on each support area 31, and are supported by the support area 31. The base plate 30, the back foil piece 21, and the top foil piece 11 are piled up in the axial direction of the rotary shaft 1.

As shown in FIGS. 3A to 3C, the back foil 20 is formed including the six back foil pieces 21 arranged in the circumferential direction of the base plate 30. The back foil pieces 21 are disposed on the support areas 31 of the base plate 30, and thus are arranged in the circumferential direction of the base plate 30. In addition, each of the back foil pieces 21 is formed to be slightly smaller than the top foil piece 11 (described later) in plan view, and therefore as shown in FIG. 3A, is covered with the top foil piece 11 at a position on the base plate 30 without being exposed to the thrust collar 4.

The back foil 20 composed of the back foil pieces 21 is formed of foils (thin sheets), and resiliently supports the top foil 10 (the top foil pieces 11). For the back foil 20, for example, it is possible to use a bump foil, a sprig foil disclosed in Japanese Unexamined Patent Application, First Publication No. 2006-57652 or in Japanese Unexamined Patent Application, First Publication No. 2004-270904, a back foil disclosed in Japanese Unexamined Patent Application, First Publication No. 2009-299748, or the like. Although the sprig foils disclosed in Japanese Unexamined Patent Application, First Publication No. 2006-57652 and in Japanese Unexamined Patent Application, First Publication No. 2004-270904, and the back foil disclosed in Japanese Unexamined Patent Application, First Publication No. 2009-299748 are foils used for a radial bearing, if each foil is developed in a flat shape and is formed in an annular sheet shape in plan view, the foil can be used for a thrust bearing.

In this embodiment, as shown in FIG. 3C, the back foil 20 is formed of a bump foil, and thus the back foil piece 21 is formed of a bump foil piece. In the back foil piece 21 (bump foil piece), a foil (metal thin sheet) having a thickness of several hundred micrometers is formed in a wave sheet shape through press molding, and as shown in FIG. 3C, the whole shape thereof is formed in an approximately pentagonal shape close to a rectangular shape.

The back foil piece 21 formed in a wave sheet shape in the above way is formed in which valley parts 22 contacting the base plate 30 and peak parts 23 contacting the top foil piece 11 are alternately disposed. As shown in FIG. 3A, the valley parts 22 and the peak parts 23 are arranged in a direction orthogonal to the extending direction in which a fixed edge 12 (described later) of the top foil piece 11 extends. That is, the arrangement direction of the valley parts 22 and the peak parts 23 (the direction in which the valley part 22 and the peak part 23 are next to each other, the direction in which the peak parts 23 are next to each other) is set to a direction orthogonal to the extending direction of the fixed edge 12. Thus, each of the valley part 22 and the peak part 23 is formed so as to extend in parallel to the fixed edge 12.

The valley parts 22 and the peak parts 23 are formed at approximately regular intervals. In addition, the height of the peak parts 23 is formed so as to increase at a constant rate from the end of the back foil piece 21 positioned to be close to the fixed edge 12, toward the opposite side of the back foil piece 21 thereto, namely toward the trailing side (the advancing side of the rotation) of the back foil piece 21 in the rotation direction of the rotary shaft 1 (the thrust collar 4) shown by an arrow R in FIG. 3A (refer to FIG. 3B).

An edge 21a on the trailing side of the back foil piece 21 in the rotation direction of the rotary shaft 1 is disposed at approximately the same position in plan view as an edge 11c (second edge) on the trailing side of the top foil piece 11 (described later) in the rotation direction of the rotary shaft 1. The back foil piece 21 is spot-welded (welded at points) on the base plate 30 in the forming direction of the valley part 22 being the edge 21a, and thus is fixed thereto.

At this time, since the entire edge 21a of the back foil piece 21 is formed of one continuous valley part 22, the entire valley part 22 can be easily welded on the base plate 30. Thus, it is possible to easily perform fixation of the back foil piece 21 through welding.

In addition, it is also possible to perform fixation of the edge 21a on the base plate 30 using fastening screws or the like other than spot-welding.

As shown in FIG. 3A, the top foil 10 is formed including six top foil pieces 11 arranged in the circumferential direction of the base plate 30. Each of the top foil pieces 11 is formed in a shape in which a portion including the apex of a sector shape of a metal thin sheet (foil) having a thickness of several hundred micrometers is removed from the sector shape, each of the inner circumferential edge (the edge on inside in the radial direction of the base plate 30) thereof and the outer circumferential edge (the edge on outside in the radial direction of the base plate 30) thereof is formed in an arc, and furthermore a portion of the edge on the leading side thereof in the rotation direction of the rotary shaft 1 (the thrust collar 4), the portion being close to the outer circumferential edge, is removed therefrom. The top foil pieces 11 having this shape are disposed on the support areas 31 of the base plate 30 so as to cover the back foil pieces 21. The top foil pieces 11 are arranged at regular intervals in the circumferential direction of the base plate 30, and the entire top foil pieces 11 are disposed in an approximately annular sheet shape, thereby forming the top foil 10.

The top foil piece 11 is formed to be slightly smaller than the support area 31 in plan view and is formed to be slightly larger than the back foil piece 21 in plan view. Therefore, the top foil pieces 11 are disposed on the support areas 31 without contacting each other, and are disposed thereon in a state of covering the tops of the back foil pieces 21 without exposing the back foil pieces 21 to the thrust collar 4. However, the present disclosure is not limited thereto. The top foil piece 11 may be formed in the same size as the back foil piece 21 in plan view, and may be formed to be smaller than the back foil piece 21 in plan view.

A fixed part 13 is formed in an area on the leading side of the top foil piece 11 in the rotation direction of the rotary shaft 1 (the thrust collar 4). The top foil piece 11 is fixed to the base plate 30 through the fixed part 13. The fixation of the fixed part 13 to the base plate 30 is performed through spot-welding (welding at points) similar to the edge 21a of the back foil piece 21. In addition, the fixation of the fixed part 13 to the base plate 30 can also be performed using fastening screws or the like other than spot-welding.

The fixed part 13 may be formed in a sheet shape or in a linear shape as long as the fixed part 13 is provided on the leading side of the top foil piece 11 in the rotation direction of the rotary shaft 1 (the thrust collar 4). In this embodiment, the fixed part 13 is configured as the fixed edge 12 formed in a linear shape. That is, although the fixed part 13 and the fixed edge 12 in this embodiment are disposed in the same position, as described later, the fixed edge of the present disclosure is configured as an edge positioned on the trailing side of the fixed part 13 in the rotation direction of the rotary shaft 1.

In this embodiment, an edge 11e (first edge) on the leading side of the top foil piece 11 in the rotation direction of the rotary shaft 1 (the thrust collar 4) is formed including an inner edge 11a extending from the inner circumferential edge toward the outer circumferential edge of the top foil piece 11, and an outer edge 11b extending to the outer circumferential edge (the edge on outside in the radial direction) of the top foil piece 11 from the end of the inner edge 11a close to the outer circumferential edge. The outer edge 11b of the edge 11e is provided with the fixed edge 12 fixed to the base plate 30.

In the top foil piece 11, each of the inner edge 11a of the edge 11e on the leading side thereof in the rotation direction of the rotary shaft 1 and the edge 11c (second edge) on the trailing side thereof in the rotation direction of the rotary shaft 1 is disposed in approximately the same position as a straight line extending from the center of the rotary shaft 1, namely from the central axis of the rotary shaft 1, in the radial direction thereof (which is the same as the radial direction of the base plate 30). Thus, the outer edge 11b serving as the fixed edge 12 is formed to be non-parallel to a straight line extending from the center of the rotary shaft 1 in the radial direction thereof such that the separation between the straight line and the outer edge 11b positioned on the trailing side of the straight line in the rotation direction of the rotary shaft 1 gradually increases to a position close to the outer circumferential edge from another position close to the inner circumferential edge of the top foil piece 11. In other words, the fixed edge 12 linearly extends such that the separation between a straight line extending in the radial direction of the base plate 30 and the fixed edge 12 positioned on the trailing side of the straight line in the rotation direction of the rotary shaft 1 gradually increases outward from inside in the radial direction of the base plate 30 and is disposed to be non-parallel to the straight line in plan view. Particularly, in this embodiment, the fixed edge 12 is formed to be parallel to the edge 11c on the trailing side of the top foil piece 11 in the rotation direction of the rotary shaft 1.

In addition, the shape of the top foil piece 11, the shapes of the fixed edge 12 and the fixed part 13, and the like are not limited to the configuration shown in FIG. 3A, and various kinds of configurations can be adopted therefor.

Figure 4A:
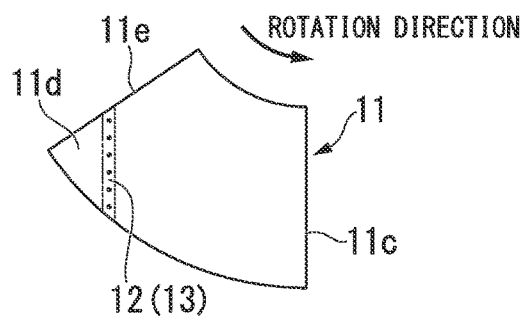

For example, as shown in FIG. 4A, in a case where a top foil piece 11 is formed in an approximately trapezoidal shape (a shape in which a portion including the apex of a sector shape is removed from the sector shape) without removing therefrom, a portion which is on the leading side of the top foil piece 11 in the rotation direction of the rotary shaft 1 (the thrust collar 4) shown by an arrow in FIG. 4A and which is close to the outer circumferential edge, only a part corresponding to the fixed edge 12 shown in FIG. 3A may be fixed to the base plate 30 through spot-welding or the like, and the fixed part may be set to the fixed edge 12 (the fixed part 13).

In this case, the fixed edge 12 is formed extending to the outer circumferential edge of the top foil piece 11 from a position between two ends of the edge 11e (first edge) on the leading side of the top foil piece 11 in the rotation direction of the rotary shaft 1, and is formed to be non-parallel to a straight line (the edge 11e on the leading side thereof in the rotation direction) extending in the radial direction of the rotary shaft 1 or of the base plate 30.

Additionally, in this case, a portion 11d, which is positioned on the leading side of the fixed edge 12 in the rotation direction of the rotary shaft 1 and is positioned to be close to the outer circumferential edge, almost does not function with respect to the load capability. However, since the work of cutting off the portion 11d can be omitted, it is possible to more easily perform the manufacture thereof than the top foil piece 11 shown in FIG. 3A, and thus to reduce the manufacturing cost thereof.

Figure 4B:
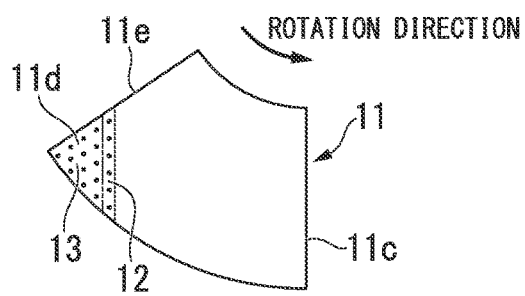

In addition, as described above, in a case where the top foil piece 11 is formed in an approximately trapezoidal shape without cutting off a portion which is on the leading side thereof in the rotation direction of the rotary shaft 1 (the thrust collar 4) and is close to the outer circumferential edge, as shown in FIG. 4B, an area including the remaining portion 11d without being cut off, namely the entire area including the portion 11d and the fixed edge 12, may be set to the fixed part 13. In this case, spot-welding or the like is performed on the entire area including the portion 11d and the fixed edge 12. If the fixed part 13 is formed in this way, the fixed part 13 is formed including the linear fixed edge 12 positioned on the trailing side of the fixed part 13 in the rotation direction of the rotary shaft 1. In other words, the fixed edge 12 is configured as the edge of the fixed part 13 positioned on the trailing side thereof in the rotation direction of the rotary shaft 1. The fixed edge 12 is formed linearly extending such that the separation between a straight line (the edge on the leading side of the top foil piece 11 in the rotation direction) extending from the center of the rotary shaft 1 in the radial direction thereof and the fixed edge 12 positioned on the trailing side of the straight line in the rotation direction of the rotary shaft 1 gradually increases toward a position close to the outer circumferential edge from another position close to the inner circumferential edge of the top foil piece 11 and is formed to be non-parallel to the straight line.

Figure 4C:
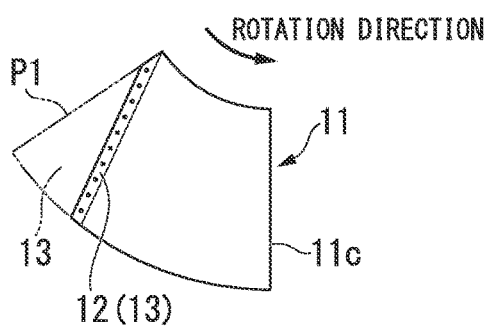

In the configuration shown in FIGS. 3A, 4A and 4B, a portion of the edge on the leading side of the top foil piece 11 in the rotation direction of the rotary shaft 1, or a part extending from an intermediate position of the edge in a direction different from the edge (extending in non-parallel to the edge) is configured as the fixed edge 12. However, as shown in FIG. 4C, the entire edge on the leading side of the top foil piece 11 in the rotation direction of the rotary shaft 1 may be configured as the fixed edge 12. In this case, a sector-shaped portion on the leading side of the top foil piece 11 in the rotation direction of the rotary shaft 1 is removed therefrom, and an edge on the leading side of the top foil piece 11 in the rotation direction is formed to be non-parallel to a straight line P1 extending from the center of the rotary shaft 1 in the radial direction thereof. That is, the fixed edge 12 is formed linearly extending such that the separation between the straight line P1 extending in the radial direction and the fixed edge 12 positioned on the trailing side of the straight line P1 in the rotation direction of the rotary shaft 1 gradually increases from the inner circumferential edge to the outer circumferential edge (increases outward from inside in the radial direction of the base plate 30), and is formed to be non-parallel to the straight line P1.

In FIG. 4C, a portion on the leading side of the fixed edge 12 in the rotation direction of the rotary shaft 1 is allowed to remain as shown by dashed double-dotted lines in FIG. 4C without cutting off the portion. In addition, an area including the portion shown by the dashed double-dotted lines may be set to the fixed part 13. Furthermore, the fixed edge 12 may be formed to be parallel to the edge 11c.

Although not shown in FIG. 4C, the peak part 23 of the back foil piece 21 extends in parallel to the edge 11c. Therefore, the arrangement direction of the peak parts 23 (the direction in which the peak parts 23 are next to each other, the right and left direction of FIG. 4C) is not orthogonal to the extending direction of the fixed edge 12, and crosses the extending direction. The top foil piece 11 and the fixed edge 12 may be configured so that the direction, in which the peak parts 23 are next to each other, and the extending direction of the fixed edge 12 cross each other in the above way.

Figure 4D:
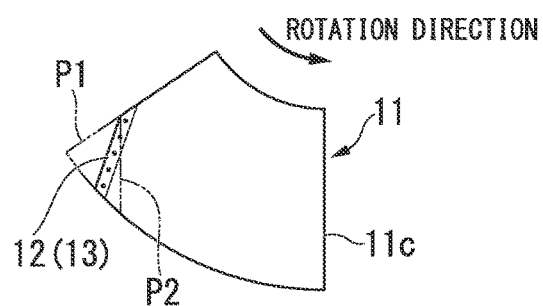

In FIG. 3A, the fixed edge 12 is formed to be parallel to the edge 11c on the trailing side of the top foil piece 11 in the rotation direction of the rotary shaft 1. However, as shown in FIG. 4D, the angle between the fixed edge 12 and a straight line P1 extending from the center of the rotary shaft 1 in the radial direction thereof may be less than the angle between the straight line P1 and a straight line P2 parallel to the edge 11c, as long as the fixed edge 12 is formed linearly extending such that the separation between the straight line P1 and the fixed edge 12 positioned on the trailing side of the straight line P1 in the rotation direction of the rotary shaft 1 gradually increases toward a position close to the outer circumferential edge from another position close to the inner circumferential edge of the top foil piece 11 (gradually increases outward from inside in the radial direction of the base plate 30), and is formed to be non-parallel to the straight line P1.

As shown in FIG. 3B, in the top foil piece 11, bending work is applied to the vicinity of the fixed edge 12, whereby the top foil piece 11 is formed to be stepped so as to secure a height thereof which is approximately the same as the height of the peak part 23 of the back foil piece 21, and part of the top foil piece 11 closer to the edge 11c than the fixed edge 12 is placed on the peak parts 23.

On the other hand, the edge 11c (the trailing edge) is configured as a free end merely supported by the peak part 23 of the back foil piece 21 without being fixed to the base plate 30 or the like.

In this embodiment, as described above, the back foil piece 21 is disposed such that the valley parts 22 and the peak parts 23 thereof are arranged in a direction orthogonal to the extending direction of the fixed edge 12 of the top foil piece 11. Thus, each of the valley parts 22 and the peak parts 23 extends in parallel to the fixed edge 12 or to the edge 11c of the top foil piece 11. Therefore, the top foil piece 11 mounted on the back foil piece 21 is disposed being inclined such that the separation between the top foil piece 11 and the inner surface (the surface facing the thrust collar 4) of the base plate 30 gradually increases from the vicinity of the fixed edge 12 toward the edge 11c in the arrangement direction of the peak parts 23 (the direction in which the peak parts 23 are next to each other, a direction orthogonal to the fixed edge 12). Additionally, in a state where a bearing load is not added thereto, the top foil piece 11 is disposed so as to be inclined at an initial inclination angle determined by the peak parts 23 of the back foil piece 21.

The initial inclination angle is an inclination angle of the top foil piece 11 to the base plate 30 when a load is zero. In addition, an inclination angle is an angle (inclination) θ determined by an increment of the height of the peak parts 23 of the back foil piece 21 as shown in FIG. 3C. The inclination angle in this embodiment is an angle between the top foil piece 11 and the inner surface of the base plate 30. In addition, the inclination angle is equivalent to the angle between the top foil piece 11 and the supported surface of the thrust collar 4. Thus, if a load increases, the peak parts 23 of the back foil piece 21 are pushed toward the base plate 30, and the entire peak parts 23 are flattened, whereby the top foil piece 11 also moves toward the base plate 30, and the inclination angle θ becomes less than the initial inclination angle.

In this structure, the top foil piece 11 is disposed such that the fixed edge 12 and the edge 11c thereof are parallel to each other, and in the back foil piece 21 supporting the top foil piece 11, the arrangement direction of the peak parts 23 thereof is orthogonal to the fixed edge 12. Therefore, the height of the edge 11c being a free end of the top foil piece 11 from the base plate 30 is constant in the state of the initial inclination angle, and the height thereof is also constant when a load is added to the back foil piece 21 through the top foil piece 11 due to rotation of the thrust collar 4 and thus the inclination angle θ decreases. That is, the height of the part of the edge 11c close to the outer circumferential edge and the height of the part thereof close to the inner circumferential edge are similarly changed even when the inclination angle changes.

That is, since the length (the length of the outer circumferential edge) in a direction orthogonal to the fixed edge 12 from the fixed edge 12 to a part of the edge 11c close to the outer circumferential edge is the same as the length (the length of the inner circumferential edge) in the direction from the fixed edge 12 to a part of the edge 11c close to the inner circumferential edge, even when the top foil piece 11 moves (rotates) away from the base plate 30 or so as to approach the base plate 30 in a state where the fixed edge 12 is a fulcrum (rotation center), the height of the part of the trailing-side edge 11c close to the outer circumferential edge and the height of the part thereof close to the inner circumferential edge become the same as each other. Thus, even when the inclination angle changes, the trailing-side edge 11c serving as a free end of the top foil piece 11 is always parallel to the thrust collar 4.

As shown in FIG. 3B, the top foil piece 11 includes a thin part 14 formed in the vicinity of the fixed edge 12, namely in the vicinity on the trailing side of the fixed edge 12 in the rotation direction of the rotary shaft 1, and the thin part 14 is formed to be thinner than another part of the top foil piece 11. The thin part 14 is linearly formed along the fixed edge 12 and is formed having a thickness of about 50% to 70% of the thickness (several hundred micrometers) of another part included in the top foil piece 11. The formation of the thin part 14 can be performed through, for example, etching. In addition, the thin part 14 is formed on the surface of the top foil piece 11 close to the back foil piece 21 in order not to affect the flow of a lubricating fluid.

As shown in FIG. 3B, the thin part 14 is formed so as not to contact the top (the ridge line) of the peak part 23 being the closest to the fixed edge 12 among the peak parts 23 of the back foil piece 21. That is, the width of the thin part 14 is set such that the thin part 14 is positioned between the fixed edge 12 and the top (the ridge line) of the peak part 23 positioned to be close to the fixed edge 12. Accordingly, a part (another part) of the top foil piece 11 other than the thin part 14 is placed on all the peak parts 23 and is supported thereby, and thus the inclination angle θ shown in FIG. 3C is maintained. In addition, since the thin part 14 is formed, the part of the top foil piece 11 closer to the edge 11c than the thin part 14 can easily and smoothly move (rotate) in a state where the fixed edge 12 is a fulcrum (or in a state where the thin part 14 is a fulcrum). Furthermore, since the thin part 14 is formed, the thickness of a part of the top foil piece 11 other than the thin part 14 can be set to be greater than that in the related art.

Next, the operation of the thrust bearing 3A(3) having the above configuration is described.

In this embodiment, as shown in FIG. 2, the thrust bearings 3A are provided on two sides of the thrust collar 4. Since the thrust bearings 3A are provided on two sides of the thrust collar 4 in this way, the moving amount of the thrust collar 4 (the rotary shaft 1) in the thrust direction can be minimized. That is, since the thrust moving amount thereof is decreased, even if the tip clearance 6 shown in FIG. 1 is narrowed, it is possible to prevent the impeller 2 or the like from contacting the housing 5, and to improve the fluid performance of a turbo machine or the like by narrowing the tip clearance 6.

In order to minimize the moving amount in the thrust direction, both thrust bearings 3A are disposed in close proximity to the thrust collar 4 so as not to form large gaps between the thrust bearings 3A and the thrust collar 4. Accordingly, the top foil pieces 11 (the top foils 10) of both thrust bearings 3A are slightly pressed on the thrust collar 4 (on the supported surfaces of the thrust collar 4). At this time, since the top foil piece 11 is provided with the thin part 14 in this embodiment, a part of the top foil piece 11 close to the edge 11c can easily move (bend). Consequently, the pressing force (the reaction force) which occurs in proportion to a pressing amount becomes small, and thus the starting torque becomes small.

In the related art, an inclination angle greater than an optimum angle is applied to a top foil piece so that the inclination angle of the top foil piece at the time a load increases is equivalent to the optimum angle. Thus, in a state where rotation thereof stops, two top foil pieces contact two surfaces of the thrust collar 4, and are in a state of being pressed on the thrust collar 4 (in a state where a preload is added thereto). However, in the related art, the entire range in the length direction of the leading-side edge of the top foil piece is fixed to a base plate, and the thickness of the top foil piece is constant. Therefore, a pressing force (preload) on the thrust collar 4 may be large, and the starting torque may be increased.

On the other hand, in this embodiment, as described above, the length of the fixed edge 12 is set to be less than the entire length of the edge 11e on the leading side of the top foil piece 11, and furthermore the top foil piece 11 is provided with the thin part 14. Therefore, an occurring pressing force (reaction force) is reduced, and the starting torque is decreased.

When the rotary shaft 1 rotates and the thrust collar 4 starts rotating, while the thrust collar 4 and the top foil piece 11 rub on each other, an ambient fluid is pushed into a wedge-shaped space (bearing clearance) in side view formed therebetween. When the rotation speed of the thrust collar 4 reaches a constant rotation speed, a fluid lubrication film is formed therebetween. The top foil pieces 11 (the top foil 10) are pressed on the back foil pieces 21 (the back foil 20) through the pressure of the fluid lubrication film, the top foil pieces 11 are separated from the thrust collar 4, and the thrust collar 4 rotates in a non-contact state with the top foil pieces 11.

When a thrust load is added thereto, the top foil piece 11 is further pushed onto the back foil piece 21, and the inclination angle θ of the top foil piece 11 is decreased. At this time, although the top foil piece 11 moves (bends) around the fixed edge 12 serving as a fulcrum on the leading side of the top foil piece 11 in the rotation direction of the rotary shaft 1, since the trailing-side edge 11c serving as a free end is set to be parallel to the fixed edge 12, a parallel state between the edge 11c and the thrust collar 4 is maintained even if the movement amount of the top foil piece 11 increases.

Thus, even when the thrust load further increases and the film thickness of the fluid lubrication film further decreases, since the top foil piece 11 is prevented from easily contacting the thrust collar 4, as a result, it is possible to support a further high thrust load.

In the thrust bearing 3A(3) in this embodiment, the fixed edge 12 fixed to the base plate 30 is formed to be non-parallel to a straight line extending from the center of the rotary shaft 1 in the radial direction thereof such that the separation between the straight line and the fixed edge 12 positioned on the trailing side of the straight line (positioned to be closer to the edge 11c than the straight line) in the rotation direction of the rotary shaft 1 gradually increases toward a position close to the outer circumferential edge from another position close to the inner circumferential edge and is formed to be parallel to the edge 11c. Therefore, even when the top foil piece 11 moves away from the base plate 30 or so as to approach the base plate 30 around the fixed edge 12 serving as a fulcrum, the movement amounts of a part of the trailing-side edge 11c close to the outer circumferential edge and of another part thereof close to the inner circumferential edge in a direction perpendicular to the base plate 30 can be the same. Thus, even if the thrust load changes during the rotation of the thrust collar 4, the trailing-side edge 11c being a free end of the top foil piece 11 can be always maintained to be parallel to the thrust collar 4, and thus deterioration of the useful life of the bearing, seizure thereof, and the like due to damage to the top foil piece 11 or the like caused by contacting the thrust collar 4 can be prevented.

The fixed edge 12 is formed extending to the outer circumferential edge from a position between two ends of the edge 11e on the leading side of the top foil piece 11 in the rotation direction of the rotary shaft 1. Therefore, the length of the fixed edge 12 can be set to be less than that of the entire leading-side edge 11e, whereby the top foil piece 11 can easily move (can easily bend), and the starting torque can be decreased. In addition, after the rotary shaft 1 starts rotating, since the top foil piece 11 also easily and smoothly moves, the optimum inclination angle thereof (for example, about 0.1°) is easily obtained, and the load capability of the bearing is improved.

Since the thin part 14 is formed in the vicinity on the trailing side of the fixed edge 12 of the top foil piece 11 in the rotation direction, the part of the top foil piece 11 close to the edge 11c can easily and smoothly move when a load is added thereto, and thus the starting torque is decreased. In addition, after the rotary shaft 1 starts rotating, since the top foil piece 11 also easily and smoothly moves, the optimum inclination angle is easily obtained, and the load capability is improved.

Since the pressure of the fluid lubrication film is increased when receiving a high thrust load, the part of the top foil piece 11 which is not directly supported by the back foil piece 21, namely the part thereof positioned right above the valley part 22 of the back foil piece 21, bends, whereby the pressure may escape therefrom, and the load capability may deteriorate.

However, in this embodiment, since the thin part 14 is formed in the vicinity of the fixed edge 12 of the top foil piece 11, it is possible to further increase the sheet thickness of the top foil piece 11 than that in the related art without limiting movement (bend) of the top foil piece 11. Thus, the sheet thickness of the top foil piece 11 is increased in this way, whereby it is possible to decrease flexure of a part of the top foil piece 11 which is not supported by the back foil piece 21, and to limit the deterioration of the load capability.

Next, a second embodiment of the thrust bearing 3 of the present disclosure is described.

Figure 5A:
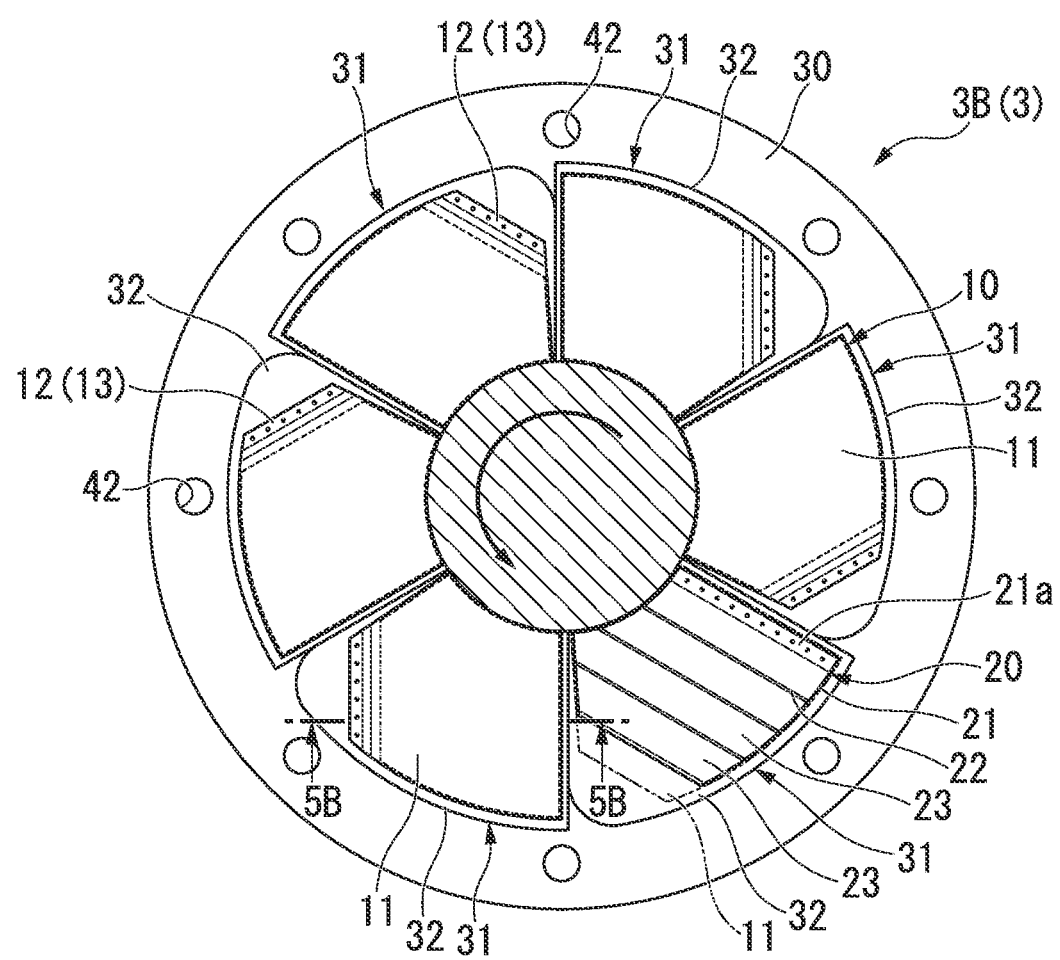
FIG. 5A is a view showing a second embodiment of a thrust bearing of the present disclosure, and is a partially cross-sectional plan view of the thrust bearing.
Figure 5B:
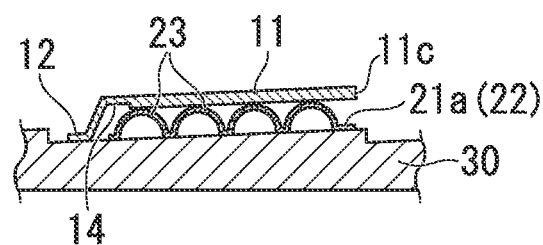
FIG. 5B is a cross-sectional view taken along 5B-5B line in FIG. 5A.
Figure 5C:
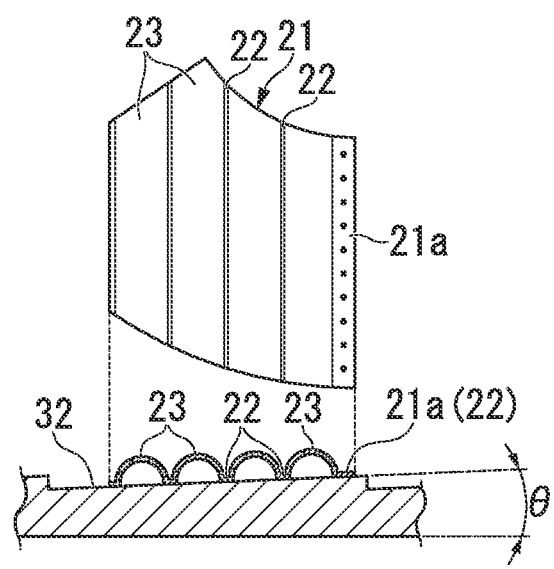
FIG. 5C is a view showing the second embodiment of the thrust bearing of the present disclosure, and is an explanatory view in which the plan view and the side view of a bump foil piece correspond to each other in order to show the shape of the bump foil piece.

The main differences of a thrust bearing 3B(3) of the second embodiment from the thrust bearing 3A(3) of the first embodiment are in that as shown in FIGS. 5A to 5C, an inclined surface 32 is formed in the support area 31 of the base plate 30, and in that the heights of all the peak parts 23 of the back foil piece 21 are set to be the same. In addition, FIG. 5A is a partially cross-sectional plan view of the thrust bearing 3, FIG. 5B is a cross-sectional view taken along 5B-5B line in FIG. 5A, and FIG. 5C is an explanatory view in which the plan view and the side view of a bump foil piece correspond to each other in order to show the shape of the bump foil piece.

In this embodiment, as shown in FIG. 5A, the inclined surface 32 is formed in the entire area supporting the back foil piece 21 and the top foil piece 11 in each support area 31, and the height of the inclined surface 32 gradually increases to the position facing the trailing-side edge 11c from the position provided with the fixed edge 12 of the top foil piece 11.

That is, as shown in FIG. 5B, the inclined surface 32 is formed so as to be inclined in the direction orthogonal to the fixed edge 12 and to the edge 11c which is parallel to the fixed edge 12.

The back foil piece 21 is formed in a wave sheet shape in which the valley parts 22 contacting the base plate 30 and the peak parts 23 contacting the top foil piece 11 are alternately disposed similarly to the first embodiment. However, in this embodiment, as shown in FIGS. 5B and 5C, the heights of all the peak parts 23 are formed to be the same.

The valley parts 22 and the peak parts 23 are arranged in a direction orthogonal to the extending direction of the fixed edge 12 of the top foil piece 11 similarly to the first embodiment. That is, the arrangement direction of the valley parts 22 and the peak parts 23 is set to be the same as a direction orthogonal to the extending direction of the fixed edge 12 and is set to be the same as the inclination direction of the inclined surface 32. Therefore, the height of the peak parts 23 of the back foil piece 21 gradually increases at a constant rate in the inclination direction of the inclined surface 32 of the base plate 30 toward the trailing side of the inclined surface 32 in the rotation direction of the rotary shaft 1. That is, the heights of the tops of the peak parts 23 are apparently the same as those in the first embodiment. Thus, the inclination angle θ of the top foil piece 11 disposed on the back foil piece 21 is formed to be similar to the first embodiment. In this embodiment, as shown in FIG. 5C, the inclination angle θ of the top foil piece 11 is determined by the inclination angle θ of the inclined surface 32.

In the thrust bearing 3B(3) of this embodiment, since the fixed edge 12 is formed to be parallel to the edge 11c, even when the top foil piece 11 moves away from the base plate 30 or so as to approach the base plate 30 around the fixed edge 12 serving as a fulcrum, the movement amounts (heights) of a part of the trailing-side edge 11c close to the outer circumferential edge and of another part thereof close to the inner circumferential edge in a direction perpendicular to the base plate 30 can also become the same. Consequently, even when the thrust load changes during the rotation of the thrust collar 4, the trailing-side edge 11c being a free end of the top foil piece 11 can be always set to be parallel to the thrust collar 4, and thus deterioration of the useful life of the bearing, seizure thereof, and the like can be prevented.

The inclined surface 32 is formed in each support area 31 of the base plate 30, the heights of all the peak parts 23 of the back foil piece 21 are set to be the same, and the arrangement direction of the peak parts 23 is set to be the same as the inclination direction of the inclined surface 32. Therefore, the top foil piece 11 is disposed on the inclined surface 32 through the back foil piece 21, and thereby the height of the top foil piece 11 can be accurately changed along the inclined surface 32. That is, a predetermined inclination angle θ can be applied to the top foil piece 11. Additionally, in this case, it is only necessary to manufacture the back foil piece 21 having a constant height without changing the height of the peak parts 23, and thus the machining cost thereof can be limited. Consequently, in the thrust bearing 3B(3), the machining thereof becomes easy, the mass productivity thereof is improved, and thus the costs thereof can be reduced. In addition, since the machining becomes easy and thus variation in quality decreases, a bearing performance (for example, a bearing load capability) expected at the time of design can be easily obtained.

According to the present disclosure, the fixed edge within the fixed part fixed to the base plate linearly extends such that the separation between a straight line extending in the radial direction and the fixed edge positioned on the trailing side of the straight line in the rotation direction of the rotary shaft gradually increases outward from inside in the radial direction of the base plate, and the fixed edge is non-parallel to the straight line. Therefore, the difference between the length of the outer circumferential edge of the top foil piece (the distance between the edges on the leading and trailing sides of the top foil piece) and the length of the inner circumferential edge thereof (the distance between the edges on the leading and trailing sides thereof) is decreased. Thus, even when the top foil piece moves (rotates) away from the base plate or so as to approach the base plate in a state where the fixed edge is a fulcrum (the rotation center), and the inclination angle of the top foil piece changes, the large movement of a part of the edge on the trailing side of the top foil piece close to the outer circumferential edge compared to that of another part thereof close to the inner circumferential edge can be limited. Consequently, even when the inclination angle of the top foil piece changes, it is possible to maintain a state where the edge being a free end on the trailing side of the top foil piece is approximately parallel to the thrust collar.

In addition, the rigidity of the vicinity of the fixed edge is reduced because the length of the fixed edge decreases, and the top foil piece easily moves around the fixed edge being a fulcrum. Thus, for example, in a case where the thrust collar is interposed between a pair of top foils, starting torque thereof is decreased. In addition, after the rotary shaft starts rotating, since the top foil piece also easily and smoothly moves, the optimum inclination angle of the top foil piece can easily obtained, and the load capability of the bearing is improved.

Furthermore, in order to increase the pressure of a fluid lubrication film formed at the top foil piece on a small side of the bearing clearance, namely on the trailing side of the bearing clearance in the rotation direction of the rotary shaft, a part on the trailing side of the bearing clearance in the rotation direction can be supported by a high rigidity, and thereby the load capability of the bearing can be improved.

The present disclosure is not limited to the above embodiments, and various modifications can be adopted with the scope of and not departing from the gist of the present disclosure.

For example, in the above embodiments, the back foil 20 and the top foil 10 are formed of six back foil pieces 21 (bump foil pieces) and six top foil pieces 11, respectively, and thus six support areas 31 are formed (set) in the base plate 30 in order to correspond thereto. However, the number of the back foil pieces 21 (bump foil pieces) or of the top foil pieces 11 may be a plural number, for example, 5 or less, or 7 or more. In this case, the number of the support areas 31 becomes the same as the number of the back foil pieces 21 (bump foil pieces) or of the top foil pieces 11.

In the second embodiment, in a case where the inclined surface 32 is formed in the support area 31 of the base plate 30, part of a support area may be formed in a flat surface, part of the back foil piece 21 may be disposed on an inclined surface, and the other part thereof may be disposed on the flat surface, without setting the entire surface with the back foil piece 21 placed thereon to be the inclined surface 32. In this case, the flat surface may be formed on the upper side (close to the edge 11c, on the trailing side) of the inclined surface, or may be formed on the lower side (close to the fixed edge 12, on the leading side) thereof. Furthermore, the flat surface may be formed on each of two sides (the leading and trailing sides) of the inclined surface.

In addition, various configurations other than the above embodiments can be adopted with respect to the shape of the top foil piece or the bump foil piece, the arrangement of the top foil piece or the bump foil piece on the support area, the inclination direction of the inclined surface, or the like.

INDUSTRIAL APPLICABILITY

The present disclosure can be used for a thrust bearing which is disposed facing a thrust collar provided on a rotary shaft and supports the thrust collar.

The invention claimed is:
1. A thrust bearing disposed so as to face a thrust collar provided on a rotary shaft, the thrust bearing comprising:
  a top foil having a first surface facing the thrust collar and
    a second surface opposite to the first surface;

a back foil disposed so as to face the second surface of the top foil, and supporting the top foil; and an annular shaped base plate disposed on a side of the back foil opposite to the top foil, and supporting the back foil, wherein the back foil includes back foil pieces arranged in a circumferential direction of the base plate, the top foil includes top foil pieces disposed on the back foil pieces, an area on a leading side of a top foil piece in a rotation direction of the rotary shaft is provided with a fixed part fixed to the base plate, a fixed region positioned on a trailing side of the fixed part in the rotation direction of the rotary shaft linearly extends such that a separation between a straight line extending in a radial direction of the base plate and the fixed region positioned on a trailing side of the straight line in the rotation direction of the rotary shaft gradually increases outward from inside in the radial direction of the base plate, and the fixed-region is non-parallel to the straight line, and the fixed region is formed so as to extend to an outer circumferential edge of the top foil piece from a position between two ends of a first edge positioned on the leading side of the top foil piece in the rotation direction of the rotary shaft.

2. The thrust bearing according to claim 1, wherein the fixed region is formed to be parallel to a second edge on a trailing side of the top foil piece in the rotation direction of the rotary shaft.

3. The thrust bearing according to claim 1, wherein the top foil piece includes a thin part formed in the vicinity on a trailing side of the fixed region in the rotation direction of the rotary shaft, and the thin part is formed to be thinner than another part of the top foil piece.

4. The thrust bearing according to claim 1, wherein at least one back foil piece of the back foil pieces is formed in a wave sheet shape in which peak parts and valley parts are alternately formed, and is disposed such that a direction, in which the peak parts are next to each other, crosses an extending direction in which the fixed region extends, and the height of the peak parts gradually increases toward a trailing side of the back foil piece in the rotation direction of the rotary shaft from an end of the back foil piece positioned to be close to the fixed region.

5. The thrust bearing according to claim 4, wherein an edge on the trailing side of the back foil piece in the rotation direction of the rotary shaft is fixed to the base plate.

6. The thrust bearing according to claim 1, wherein the base plate is provided with support areas supporting the back foil pieces, and each support area is provided with an inclined surface whose height gradually increases from a position, in which the fixed region is provided, toward a trailing side of the support area in the rotation direction of the rotary shaft.

7. The thrust bearing according to claim 6, wherein at least one back foil piece of the back foil pieces is formed in a wave sheet shape in which peak parts and valley parts are alternately formed, and is disposed such that a direction, in which the peak parts are next to each other, is the same as an inclination direction of the inclined surface.

8. The thrust bearing according to claim 7, wherein an edge on a trailing side of the back foil piece in the rotation direction of the rotary shaft is fixed to the base plate.

9. A thrust bearing disposed so as to face a thrust collar provided on a rotary shaft, the thrust bearing comprising:

a top foil having a first surface facing the thrust collar and a second surface opposite to the first surface;

a back foil disposed so as to face the second surface of the top foil, and supporting the top foil; and an annular shaped base plate disposed on a side of the back foil opposite to the top foil, and supporting the back foil, wherein the back foil includes back foil pieces arranged in a circumferential direction of the base plate, the top foil includes top foil pieces disposed on the back foil pieces, an area on a leading side of a top foil piece in a rotation direction of the rotary shaft is provided with a fixed part fixed to the base plate, a fixed region positioned on a trailing side of the fixed part in the rotation direction of the rotary shaft linearly extends such that a separation between a straight line extending in a radial direction of the base plate and the fixed region positioned on a trailing side of the straight line in the rotation direction of the rotary shaft gradually increases outward from inside in the radial direction of the base plate, and the fixed region is non-parallel to the straight line, a first edge on the leading side of the top foil piece in the rotation direction of the rotary shaft includes an inner edge extending from an inner circumferential edge toward an outer circumferential edge of the top foil piece, and an outer edge extending to the outer circumferential edge from an end of the inner edge close to the outer circumferential edge, and the outer edge is provided with the fixed region.

10. The thrust bearing according to claim 9, wherein the fixed region is formed to be parallel to a second edge on a trailing side of the top foil piece in the rotation direction of the rotary shaft.

11. The thrust bearing according to claim 9, wherein the top foil piece includes a thin part formed in the vicinity on a trailing side of the fixed region in the rotation direction of the rotary shaft, and the thin part is formed to be thinner than another part of the top foil piece.

* * * * *